United States Patent
Cho et al.

(10) Patent No.: US 9,392,551 B2
(45) Date of Patent: Jul. 12, 2016

(54) APPARATUS AND METHOD FOR MATCHING ANTENNA IMPEDANCE IN WIRELESS COMMUNICATION SYSTEM

(71) Applicant: Samsung Electronics Co., Ltd., Suwon-si, Gyeonggi-do (KR)

(72) Inventors: Dong-Kyoon Cho, Suwon-si (KR); Seong-Wook Song, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 13/868,464

(22) Filed: Apr. 23, 2013

(65) Prior Publication Data

US 2013/0281167 A1    Oct. 24, 2013

(30) Foreign Application Priority Data

Apr. 23, 2012 (KR) .................. 10-2012-0042319

(51) Int. Cl.
H04W 52/24 (2009.01)
H04B 17/12 (2015.01)
H04W 52/14 (2009.01)

(52) U.S. Cl.
CPC ............ *H04W 52/24* (2013.01); *H04B 17/12* (2015.01); *H04W 52/245* (2013.01); *H04W 52/146* (2013.01); *Y02B 60/50* (2013.01)

(58) Field of Classification Search
CPC .................................................. H04W 52/245
See application file for complete search history.

(56) References Cited

U.S. PATENT DOCUMENTS

| | | | |
|---|---|---|---|
| 4,980,656 A * | 12/1990 | Duffalo et al. | 333/17.1 |
| 7,324,785 B2 | 1/2008 | Hansen et al. | |
| 8,320,850 B1 | 11/2012 | Khlat | |
| 2002/0090966 A1 | 7/2002 | Hansen et al. | |
| 2006/0094458 A1 | 5/2006 | Kitaji | |
| 2006/0132360 A1 | 6/2006 | Caimi et al. | |
| 2006/0183431 A1 | 8/2006 | Chang et al. | |
| 2006/0281423 A1 | 12/2006 | Caimi et al. | |
| 2007/0142014 A1 * | 6/2007 | Wilcox | 455/276.1 |
| 2007/0200766 A1 | 8/2007 | McKinzie, III et al. | |
| 2007/0222697 A1 | 9/2007 | Caimi et al. | |
| 2007/0285326 A1 | 12/2007 | McKinzie et al. | |
| 2009/0231220 A1 | 9/2009 | Zhang et al. | |
| 2010/0022203 A1 | 1/2010 | Bonnet et al. | |
| 2010/0085260 A1 | 4/2010 | McKinzie et al. | |
| 2011/0105023 A1 | 5/2011 | Scheer et al. | |
| 2012/0119971 A1 | 5/2012 | Bae | |

FOREIGN PATENT DOCUMENTS

| | | |
|---|---|---|
| CN | 101133560 A | 2/2008 |
| KR | 2001-0074610 A | 8/2001 |
| KR | 10-2008-0084154 A | 9/2008 |
| KR | 10-2009-0057350 A | 6/2009 |
| KR | 10-2010-0127827 A | 12/2010 |
| KR | 10-2011-0017107 A | 2/2011 |

* cited by examiner

*Primary Examiner* — David Bilodeau
(74) *Attorney, Agent, or Firm* — Jefferson IP Law, LLP

(57) ABSTRACT

An apparatus and method for matching antenna impedance in a mobile station are provided. In implementation, a mobile station receives power control information including information for controlling transmit power of the mobile station, generates matching control information for antenna impedance matching based on the received power control information, and performs antenna impedance matching depending on the generated matching control information.

34 Claims, 7 Drawing Sheets

APPARATUS AND METHOD FOR MATCHING ANTENNA IMPEDANCE IN WIRELESS COMMUNICATION SYSTEM

PRIORITY

This application claims the benefit under 35 U.S.C. §119 (a) of a Korean patent application filed on Apr. 23, 2012 in the Korean Intellectual Property Office and assigned Serial No. 10-2012-0042319, the entire disclosure of which is hereby incorporated by reference.

BACKGROUND OF THE INVENTION

1. Field of the Invention

The present invention relates to an apparatus and method for a wireless communication system. More particularly, the present invention relates to an apparatus and method for matching antenna impedance in a wireless communication system.

2. Description of the Related Art

The transmission efficiency of an antenna is affected by its input impedance. Accordingly, a transmitter typically performs impedance matching such that the reflective wave at the transmit antenna port may be minimized. However, the radiation impedance of the antenna varies depending on the surrounding environment, and appears very high at a frequency of 100 MHz or more.

In the case of a mobile station, the input impedance of its antenna varies significantly depending on the position of the user's hand that is holding the mobile station, and the manner in which the user grips the mobile station. The variation in the input impedance of the antenna causes a significant reduction in the transmit power that is actually output via the antenna.

In order to address these disadvantages and other problems, an antenna impedance matching method for minimizing the reflective wave has been used in the related art. However, to adopt this antenna impedance matching method, a component for calculating the reflection coefficient of the transmitter is additionally required. Undesirably, however, the use of the additional component may cause an increase in the manufacturing cost and make the antenna impedance matching process complicated. Accordingly, there is a need for an improved apparatus and method for matching antenna impedance in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for matching antenna impedance in a wireless communication system.

Another aspect of the present invention is to provide an antenna impedance matching apparatus and method for efficiently using the transmit power of an antenna in a wireless communication system.

Another aspect of the present invention is to provide an apparatus and method for simply and effectively performing antenna impedance matching.

In accordance with an aspect of the present invention, a mobile station is provided. The mobile station includes a receiver for receiving power control information including information for controlling transmit power of the mobile station, a matching controller for generating matching control information for antenna impedance matching based on the received power control information, and an antenna matcher for performing antenna impedance matching depending on the generated matching control information.

In accordance with another aspect of the present invention, a method for matching antenna impedance in a mobile station is provided. The method includes receiving power control information including information for controlling transmit power of the mobile station, generating matching control information for antenna impedance matching based on the received power control information, and performing antenna impedance matching depending on the generated matching control information.

In accordance with another aspect of the present invention, an apparatus for matching antenna impedance is provided. The apparatus includes an antenna matcher for, upon receiving matching control information generated based on power control information, performing antenna impedance matching depending on the received matching control information. The power control information includes information for controlling transmit power of a mobile station, and is received from a base station.

In accordance with another aspect of the present invention, a method for matching antenna impedance is provided. The method includes determining whether matching control information generated based on power control information is received, and upon receiving the matching control information, performing antenna impedance matching depending on the received matching control information. The power control information includes information for controlling transmit power of a mobile station, and is received from a base station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 7A to 8B are graphs illustrating frequency characteristics of an antenna according to an exemplary embodiment of the present invention.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and method for matching antenna impedance in a wireless communication system. The wireless communication system proposed by an exemplary embodiment of the present invention may include Global System for Mobile communications (GSM), Wideband Code Division Multiple Access (WCDMA), and Long Term Evolution (LTE) systems. The apparatus and method proposed by an exemplary embodiment of the present invention may be applied to a system in which a power control method is used, for example, to a High Speed Packet Access (HSPA) system and the like.

Prior to a description of an exemplary embodiment of the present invention, an antenna impedance matching apparatus and method used in a wireless communication system of the related art will be described with reference to FIGS. 1 and 2.

Figure 1:
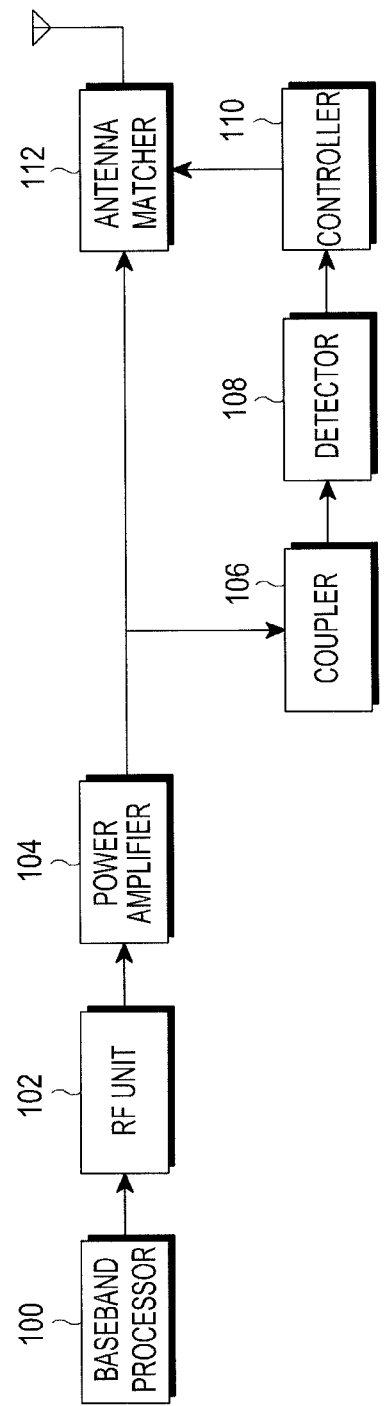
FIG. 1 illustrates an antenna impedance matching apparatus used in a wireless communication system of the related art.

FIG. 1 illustrates an antenna impedance matching apparatus used in a wireless communication system of the related art.

Referring to FIG. 1, the antenna impedance matching apparatus of the related art includes a baseband processor 100, a Radio Frequency (RF) unit 102, a power amplifier 104, a coupler 106, a detector 108, a controller 110, and an antenna matcher 112.

The baseband processor 100 generates a transmission waveform, and outputs a baseband signal to the RF unit 102. The RF unit 102 converts the baseband signal into a transmission frequency band signal (or an RF signal), and outputs it to the power amplifier 104. The power amplifier 104 amplifies the converted signal at a predetermined magnitude, and transmits the amplified signal via an antenna.

If impedance at a previous stage of an antenna is represented as Z and impedance of the antenna is represented as $Z_a$, a ratio of a reflected signal to a transmitted signal due to the impedance mismatch is represented as a reflection coefficient, which is expressed as R in the following Equation (1).

$$R=(Z_a-Z)/(Z_a+Z) \quad \text{Equation (1)}$$

The purpose of the impedance matching is to minimize the power of the reflected signal, i.e., the reflection coefficient. In order to measure the reflection coefficient, the coupler 106 illustrated in FIG. 1 should be used. The coupler 106 measures power of each of an input signal and its reflected signal, and outputs information about the measured power of the input signal and reflected signal to the detector 108. Based on the measured power of the input signal and reflected signal, the detector 108 detects a value for antenna impedance matching, such as a reflection coefficient, and outputs it to the controller 110.

The controller 110 determines an antenna impedance matching control value using the detected value, and outputs the determined antenna impedance matching control value to the antenna matcher 112. The antenna matcher 112 matches the impedance at the previous stage of the antenna to the impedance of the antenna using the antenna impedance matching control value, making it possible to transmit a signal whose reflection coefficient is minimized.

As such, the common wireless communication system needs to use additional components such as the coupler 106, the detector 108 and a duplexer, for the antenna impedance matching. However, the use of the additional components may cause an increase in the manufacturing cost and complicates the antenna impedance matching process.

Considering these and other problems and disadvantages, an exemplary embodiment of the present invention provides an apparatus and method for performing a simpler and more effective antenna impedance matching process. In addition, an exemplary embodiment of the present invention provides an apparatus and method for increasing the transmit power efficiency of an antenna by maximizing a transfer coefficient (which is a ratio of a transmitted signal to a reflected signal), unlike the technology of the related art that minimizes the reflection coefficient (which is a ratio of a reflected signal to a transmitted signal).

An exemplary embodiment of the present invention performs antenna impedance matching using the power control method used in the wireless communication system. Typically, the wireless communication system using the power control method includes an HSPA system. The power control method used in the wireless communication system such as the HSPA system will be described in brief below with reference to FIG. 2. It will be apparent to those of ordinary skill in the art that the power control method is not limited to the power control method illustrated in FIG. 2, and the power control method may include any other type of power control method that transmits power control information to a mobile station.

Figure 2:
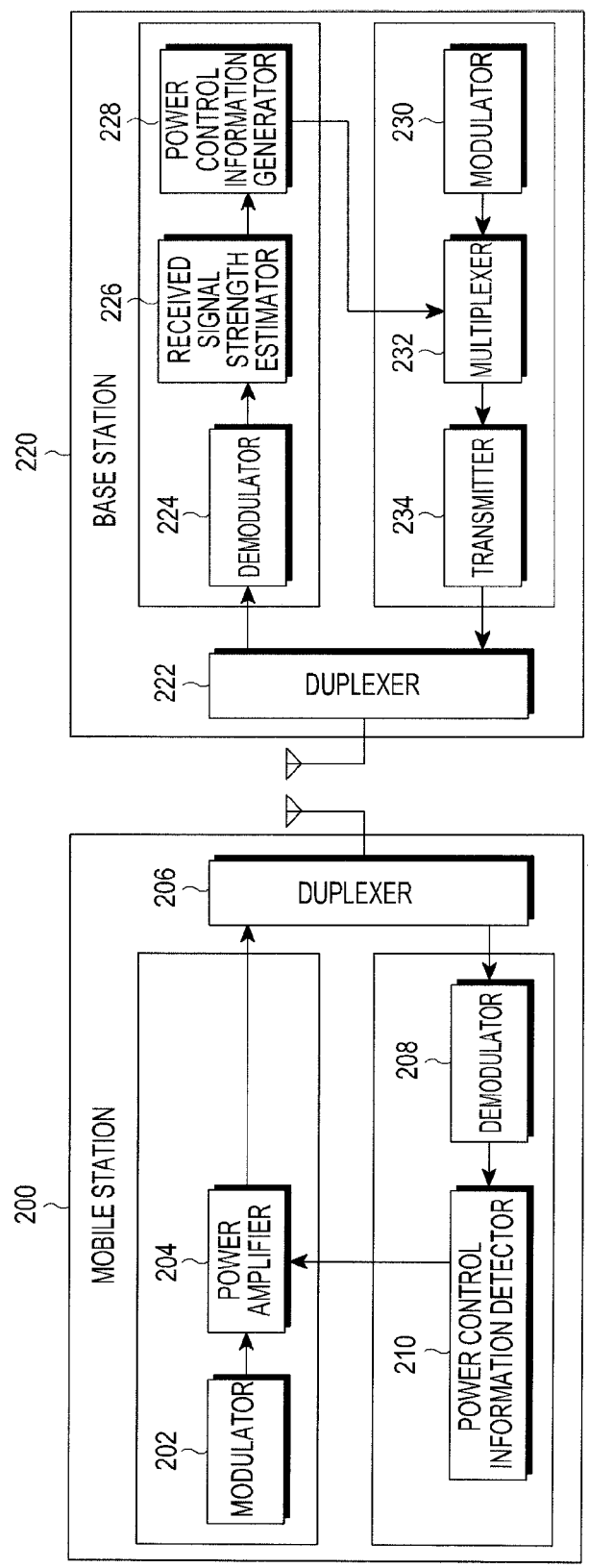
FIG. 2 is a block diagram of a base station and a mobile station that perform a power control method in a wireless communication system of the related art.

FIG. 2 is a block diagram of a base station and a mobile station that perform a power control method in a wireless communication system of the related art.

Referring to FIG. 2, a mobile station 200 includes a modulator 202, a power amplifier 204, a duplexer 206, a demodulator 208, and a power control information detector (or a power control information extractor) 210. A base station 220 includes duplexer 222, a demodulator 224, a received signal strength estimator 226, a power control information generator 228, a demodulator 230, a multiplexer 232, and a transmitter 234.

A method for controlling power of the mobile station 200 in the above mobile station 200 and base station 220 is as follows.

In the mobile station 200, the modulator 202 modulates a transmission signal and outputs it to the power amplifier 204. The power amplifier 204 amplifies the modulated signal at a predetermined signal magnitude, and the duplexer 206 transmits the amplified signal to the base station 220 via an antenna.

In the base station 220, upon receiving a signal transmitted from the mobile station 200 via an antenna, the duplexer 222 outputs the received signal to the demodulator 224. The demodulator 224 demodulates the received signal and outputs it to the received signal strength estimator 226. The received signal strength estimator 226 measures the strength of the received signal (for example, Signal-to-Interference Ratio (SIR), Received Signal Strength Indication (RSSI), Block Error Rate (BLER) of a received signal, and the like).

Based on the measured received signal strength, the power control information generator 228 generates power control information for maintaining the demodulation performance of the base station 220. In the case of, for example, a WCDMA communication system, in order to maintain the desired level of sound quality, the power control information generator 228 may set a target SIR or a target BLER, and generate power control information (for example, a Transmit Power Control (TPC) command) that makes it possible to increase or decrease transmit power of a mobile station's transmitter, on the basis of the set target SIR or BLER.

For a better understanding, an example thereof will be described below. The power control information generator 228 measures a received SIR and compares it with a target SIR, at intervals of a slot (for example, 0.667 usec). The power control information generator 228 generates power control information including a first value (for example, '1') if the received SIR is greater than the target SIR, and generates power control information including a second value (for example, '0') if the received SIR is less than or equal to the target SIR.

The generated power control information is added to the signal modulated by the modulator 230, in the multiplexer 232, and transmitted to the mobile station 200 through the transmitter 234 and the duplexer 222.

In the mobile station 200, the signal is received through the antenna and the duplexer 206. The received signal is demodulated by the demodulator 208 and output to the power control information detector 210. The power control information detector 210 detects power control information from the demodulated signal. The power control information may be detected at intervals of a slot (for example, 0.666 usec).

The power control information detector 210 controls a gain of the power amplifier 204 to amplify a signal at a magnitude corresponding to the detected power control information. For example, the mobile station 200 may control the gain of the power amplifier 204 to decrease its transmit power by 1 dB if the detected power control information includes the first value, and may control the gain of the power amplifier 204 to increase its transmit power by 1 dB if the detected power control information includes the second value.

Accordingly, the transmitter of the mobile station 200 transmits a signal with the transmit power determined by the base station 220, thereby improving its communication performance with the base station 220.

This method of controlling power through a feedback process between the mobile station 200 and the base station 220 is generally called a power control loop. Although a method of controlling power for the mobile station 200 is considered in FIG. 2, power of the base station 220 may also be controlled using a method similar to the method described in conjunction with FIG. 2. In addition, the mobile station 200 and the base station 220 may control power of each other. Actually, in the GSM and WCDMA communication systems, the power control method is used in both the uplink and downlink so as to maintain the receiving performance despite any change in a wireless channel environment, such as fading.

An exemplary embodiment of the present invention makes it possible to perform antenna impedance matching using the power control information that is transmitted and received in the general power control process. A description thereof will be made below with reference to FIG. 3.

Figure 3:
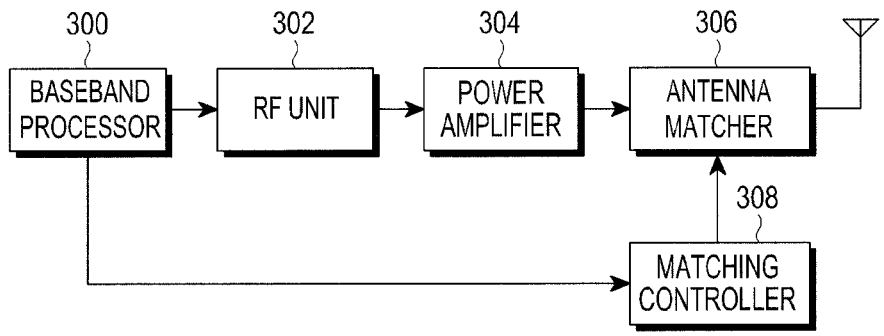
FIG. 3 illustrates an antenna impedance matching apparatus according to an exemplary embodiment of the present invention.

FIG. 3 illustrates an antenna impedance matching apparatus according to an exemplary embodiment of the present invention.

Referring to FIG. 3, the antenna impedance matching apparatus includes a baseband processor 300, an RF unit 302, a power amplifier 304, an antenna matcher 306, and a matching controller 308.

The baseband processor 300 up/down-converts an RF signal into an Intermediate Frequency (IF) analog signal or digital signal. The RF unit 302 converts the signal output from the baseband processor 300 into a transmission frequency band signal (or RF signal), and the power amplifier 304 amplifies the converted signal at a predetermined magnitude.

The antenna matcher 306, under control of the matching controller 308, matches impedance of the antenna to impedance at a previous stage of the antenna, and transits the amplified signal from the power amplifier 304, via an antenna.

If a signal is output from the baseband processor 300 as a signal is received from the transmitter, the matching controller 308 detects power control information from the output signal. The power control information may be detected at intervals of a slot (for example, 0.666 usec). The matching controller 308 detects power control information from the received signal for a predetermined time, and determines a variation of transmit power based on the detected power control information. Based on the determined variation of transmit power, the matching controller 308 generates matching control information for matching the impedance of the antenna to the impedance of the previous stage of the antenna. The matching controller 308 outputs the generated matching control information to the antenna matcher 306, thereby performing antenna impedance matching.

An exemplary antenna impedance matching apparatus may be incorporated into a receiver, for example, a mobile station. However, the antenna impedance matching apparatus may also be incorporated into a transmitter, for example, a base station. For convenience, the following description will assume that an exemplary antenna impedance matching apparatus of the present invention is incorporated into a mobile station.

An exemplary process of performing antenna impedance matching by a mobile station including the antenna impedance matching apparatus will be described with reference to FIG. 4.

Figure 4:
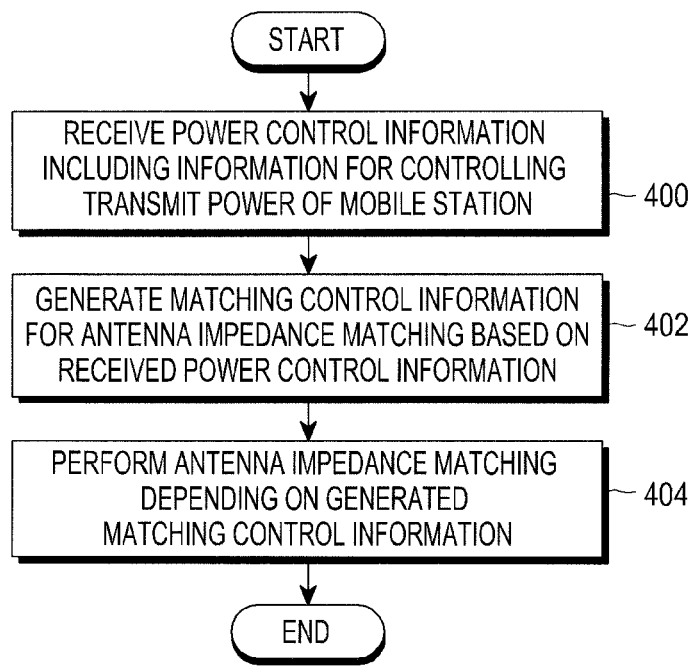
FIG. 4 is a flowchart illustrating a process of performing antenna impedance matching by a mobile station in a wireless communication system according to an exemplary embodiment of the present invention.

FIG. 4 is a flowchart illustrating a process of performing antenna impedance matching by a mobile station in a wireless communication system according to an exemplary embodiment of the present invention.

Referring to FIG. 4, the mobile station receives power control information including information for controlling the transmit power of the mobile station in step 400. The power control information may be received from a base station in every slot or at predetermined intervals. Notably, the intervals at which the power control information is received are not limited and may be subject to change.

The information for controlling the transmit power of the mobile station represents information that makes it possible to increase or decrease the transmit power of the mobile station, and may be determined based on the received signal strength (for example, RSSI, SIR, BLER, etc.) measured by the base station.

Upon receiving the power control information, the mobile station may determine a transmit power variation of the mobile station. In step 402, the mobile station generates matching control information associated with the determined transmit power's variation based on the received power control information. In step 404, the mobile station performs antenna impedance matching depending on the generated matching control information.

In an exemplary implementation, steps 400 and 402 may be performed in the matching controller 308 illustrated in FIG. 3, and step 404 may be performed in the antenna matcher 306.

Figure 5:
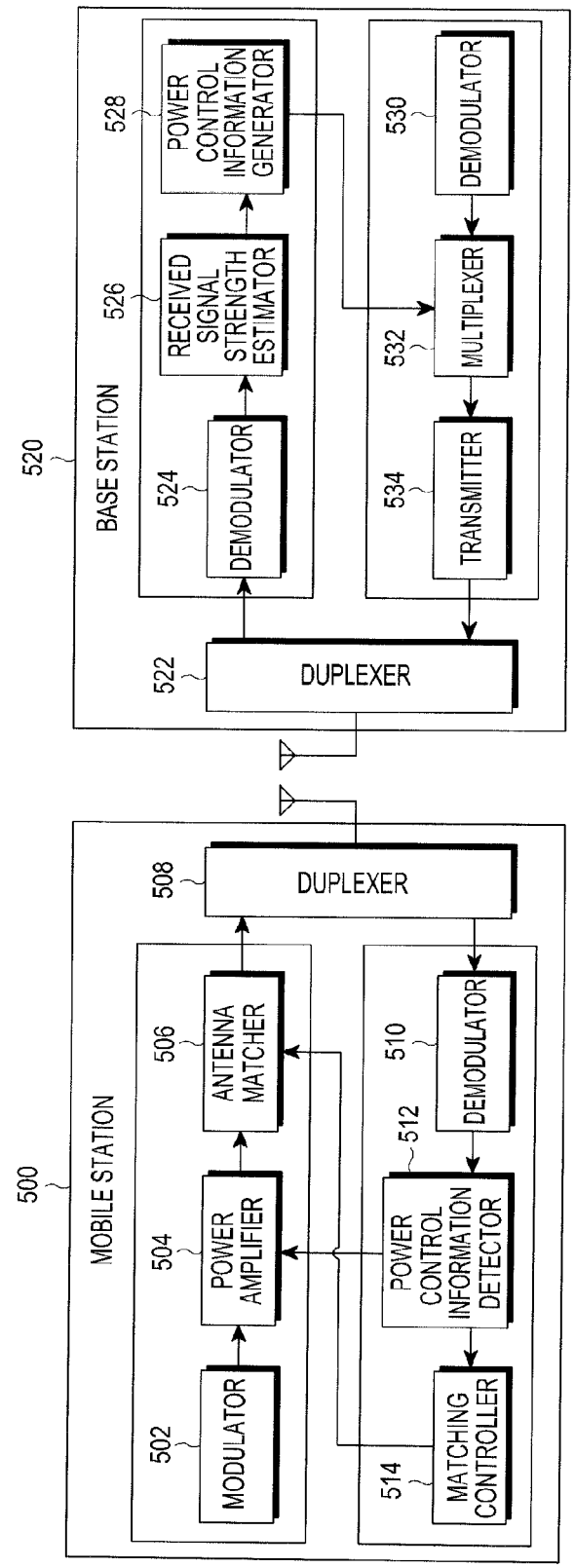
FIG. 5 is a block diagram of a base station and a mobile station according to an exemplary embodiment of the present invention.

FIG. 5 is a block diagram of a base station and a mobile station according to an exemplary embodiment of the present invention.

Referring to FIG. 5, a base station 520 includes a duplexer 522, a demodulator 524, a received signal strength estimator 526, a power control information generator 528, a modulator 530, a multiplexer 532 and a transmitter 534. The base station 520 is substantially the same as the base station 220 illustrated in FIG. 2 in terms of the structure, so a detailed description thereof will be omitted for simplicity purpose only.

A mobile station 500 includes a modulator 502, a power amplifier 504, an antenna matcher 506, a duplexer 508, a demodulator 510, a power control information detector 512, and a matching controller 514. The modulator 502, the power amplifier 504, the duplexer 508, the demodulator 510, and the power control information detector 512 perform the same operation as that of the modulator 202, the power amplifier 204, the duplexer 206, the demodulator 208, and the power control information detector 210 illustrated in FIG. 2.

The antenna matcher 506 and the matching controller 514 are components newly proposed in an exemplary embodiment of the present invention, and correspond to the antenna matcher 306 and the matching controller 308 illustrated in FIG. 3. The antenna matcher 506 includes a variable capacitor. The matching controller 514 controls the variable capacitor using a Serial Peripheral Interface (SPI) and the like so that antenna impedance matching may be performed.

More specifically, the matching controller 514 detects a transmit power variation for the mobile station 500 based on the power control information, which has been received from the base station 520 for a predetermined time period. The matching controller 514 detects a variable capacitance (i.e., a value of the variable capacitor) corresponding to the detected transmit power variation, referring to a table including a variable capacitance associated with each transmit power variation. The matching controller 514 generates matching control information including the detected variable capacitance and outputs it to the antenna matcher 506. In response, the antenna matcher 506 controls the variable capacitor to have the variable capacitance included in the matching control information so that antenna impedance matching may be performed.

An exemplary embodiment of the present invention performs antenna impedance matching taking into account a relationship between the transmit power and the transfer coefficient. This will be described in more detail below.

The transfer coefficient that is determined considering the input impedance mismatch of the mobile station 500 is defined as Equation (2) below.

$$T = 2Z_a/(Z+Z_a) \qquad (2)$$

In Equation (2), T denotes the transfer coefficient, $Z_a$ denotes impedance at a previous stage of an antenna mounted in the mobile station 500, and Z denotes impedance of the antenna mounted in the mobile station 500.

Transmitted signal power $P_t$ of the mobile station 500, which is measured in the base station 520, may be defined as Equation (3) below.

$$P_r = T \times P_t \times G_h \qquad (3)$$

In Equation (3), $P_r$ denotes the received signal strength, i.e., power of a received signal, and $G_h$ denotes a path loss in a wireless channel.

If a transfer coefficient, which is given before control of antenna impedance matching, is defined as $T_0$, the transmitted signal power $P_t$ of the mobile station 500 may be adjusted using Equation (4) below. In other words, the transmitted signal power $P_t$ of the mobile station 500 is adjusted so that received signal power of the base station 520 may maintain a constant value as the change in the wireless channel is compensated for.

$$P_0 = T_0 \times P_t \times G_h = C \qquad \text{Equation (4)}$$

In Equation (4), $P_0$ denotes received signal power of the base station 520, and C denotes a predetermined power value.

In a case where antenna impedance matching is performed using the power control method, i.e., in a case where a variable capacitance for antenna impedance matching is changed in the impedance matcher 506 of the mobile station 500, if the transfer coefficient is defined as $T_k$, received power $P_I$ at an antenna of the base station 520 is defined as Equation (5) below.

$$P_I = E[P_r] = T_k \hat{P}_t G_h \qquad \text{Equation (5)}$$

Since the power control method makes it possible to maintain the received power, the received power $P_I$ is determined as Equation (6) below if the power control method is used.

$$P_I = P_O = C \qquad \text{Equation (6)}$$

In this case, transmit power of the mobile station 500 is estimated using Equation (7) below.

$$\hat{P}_t = P_t \frac{T_o}{T_k} \qquad \text{Equation (7)}$$

While the power control method is used, an increase in transmit power of the mobile station 500 indicates that the transfer coefficient $T_k$ is reduced compared with $T_0$, and a decrease in transmit power of the mobile station 500 indicates that the transfer coefficient $T_k$ is increased compared with $T_0$. In other words, the transmit power variation and transfer coefficient of the mobile station 500, which are determined by power control of the base station 520, are inversely proportional as given in Equation (8) below.

$$\frac{\hat{P}}{P_t} = \frac{T_o}{T_k} \qquad \text{Equation (8)}$$

Therefore, in an exemplary embodiment of the present invention, antenna impedance matching may be performed using the power control information, thereby ensuring the frequency characteristics in which the transfer coefficient is high. The antenna impedance matching process may be performed at predetermined intervals, so a variable capacitance, which is matching control information used for the antenna impedance matching, may be periodically updated.

A process of updating matching control information according to an exemplary embodiment of the present invention will be described below with reference to FIG. 6.

Figure 6:
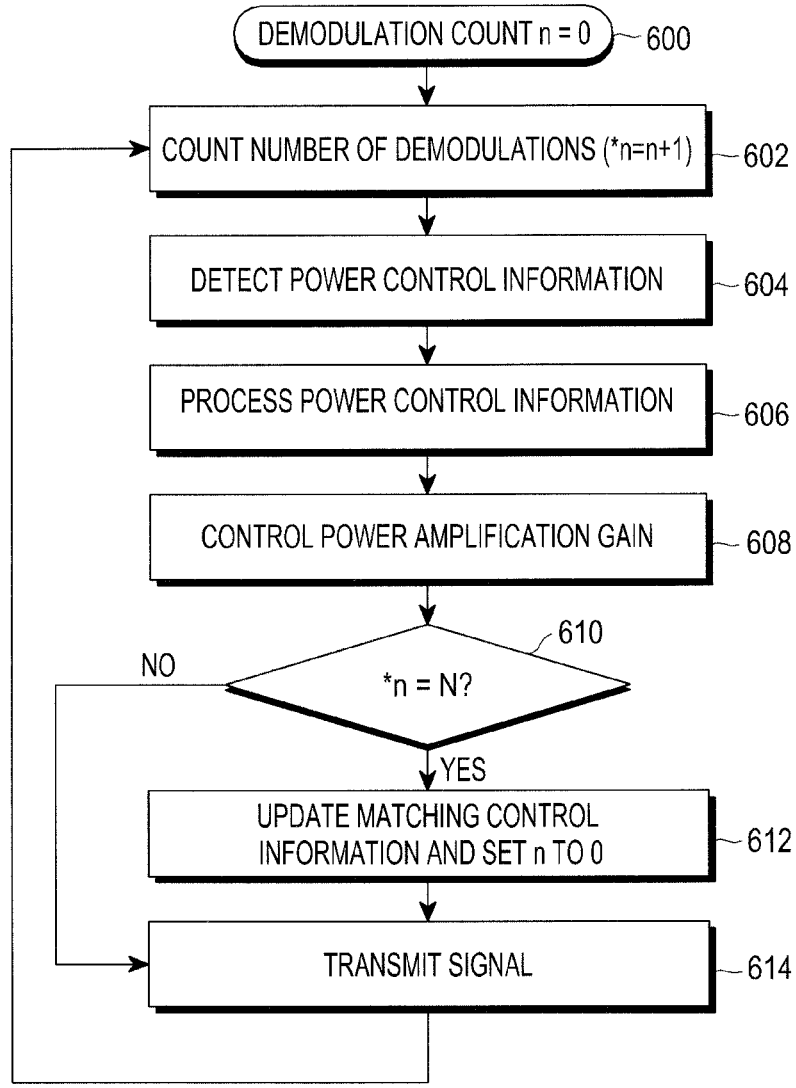
FIG. 6 is a flowchart illustrating a process of updating matching control information in a mobile station according to an exemplary embodiment of the present invention.

FIG. 6 is a flowchart illustrating a process of updating matching control information in a mobile station according to an exemplary embodiment of the present invention.

Referring to FIG. 6, the process may start when a signal demodulation count n (or the number of receiving power control information) of a base station has not reached a predetermined number N. If the signal demodulation count n is 0 in step 600, the mobile station increases the signal demodulation count by one in step 602. In other words, the mobile station the signal demodulation count n by one (*n=n+1).

The mobile station detects power control information in step 604, and processes the detected power control information in step 606. In other words, the mobile station generates matching control information (including, for example, a variable capacitance) to be used for antenna impedance matching, using the power control information. In step 608, the mobile station controls its power amplification gain to amplify a signal at a magnitude corresponding to the power control information.

The mobile station determines in step 610 whether *n is equal to the predetermined number N. If *n=N, the mobile station updates the previously set matching control information using the generated matching control information and re-sets n to 0 in step 612. The mobile station then transmits a signal in step 614. However, if *n≠N, the mobile station transmits a signal without updating the matching control information in step 614.

As illustrated in FIG. 6, in an exemplary embodiment of the present invention, the process of updating the matching control information for antenna impedance matching may be periodically performed.

Next, an exemplary process of changing the frequency characteristics of an antenna so as to increase the transfer coefficient by using the matching control information will be described with reference to FIGS. 7A to 8B.

FIGS. 7A to 8B are graphs illustrating frequency characteristics of an antenna according to an exemplary embodiment of the present invention. In the graphs of FIGS. 7A to 8B, the horizontal axis represents the frequency and the vertical axis represents the reflection coefficient.

Figures 7A, 7B:
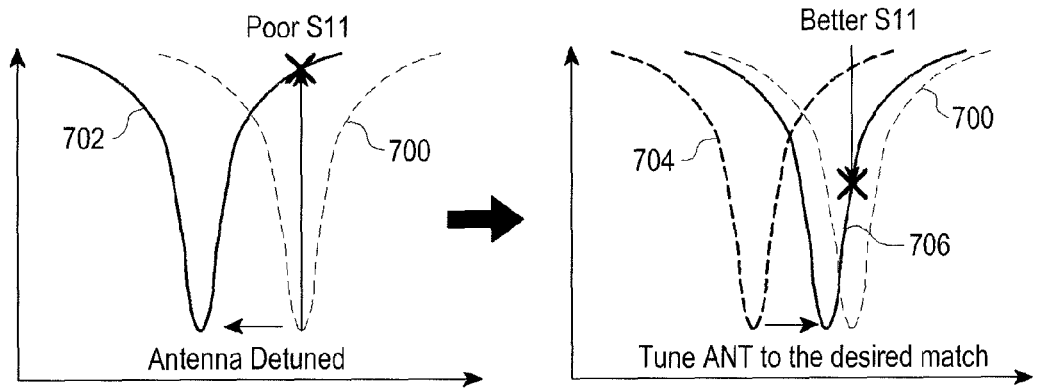

Referring to FIG. 7A, if a user holds a mobile station with his/her hand, antenna impedance mismatch occurs, so the antenna's frequency characteristics change from a first curve 700 to a second curve 702 and the reflection coefficient S11 also increases.

Accordingly, as described above, an exemplary embodiment of the present invention controls a variable capacitance for antenna impedance matching so that impedance matching may be achieved between an antenna and its previous stage. If the variable capacitance is controlled, the antenna's frequency characteristics may be changed in a desired direction (i.e., from a third curve 704 to a fourth curve 706) as illustrated in FIG. 7B. As a result, the reflection coefficient S11 decreases, making it possible to offset the rapid degradation of the signal.

Figures 8A, 8B:
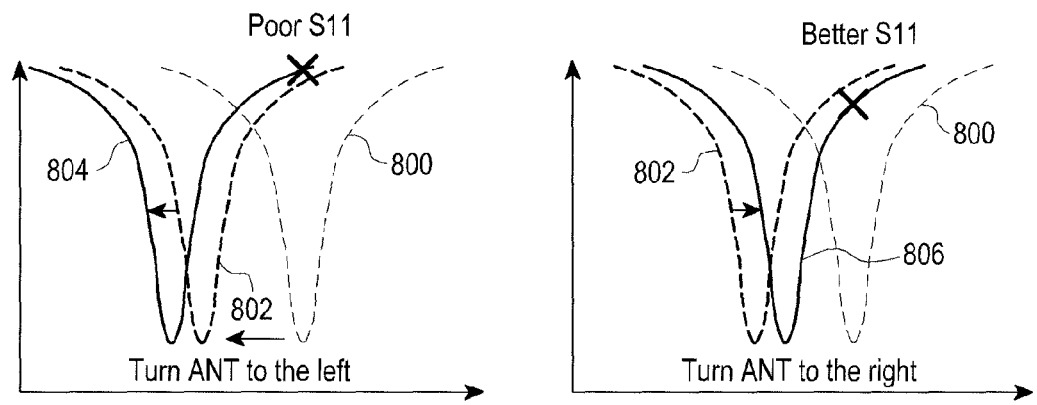

Referring to FIG. 8A, if the user does not hold the mobile station with his/her hand, the antenna's frequency appears as a fifth curve 800, and if the user holds the mobile station with his/her hand, the antenna's frequency appears as a sixth curve 802. In this case, the mobile station determines a variable capacitance to move the sixth curve 802 left or right, for frequency matching. Power control information received from the base station may be used to determine the variable capacitance.

If the sixth curve 802 is situated in the position of a seventh curve 804 by shifting the frequency to the left as illustrated in FIG. 8A, the reflection coefficient S11 is higher compared to before the change in the frequency characteristics, so the transmit power is reduced. In this case, therefore, the base station transmits, to the mobile station, power control information for instructing to increase the transmit power.

If the sixth curve 802 is situated in the position of an eighth curve 806 by shifting the frequency to the right as illustrated in FIG. 8B, the reflection coefficient S11 is lower compared to before the change in the frequency characteristics, so the transmit power increases. In this case, therefore, the base station transmits, to the mobile station, power control information for instructing to decrease the transmit power.

As such, in each of FIGS. 8A and 8B, the mobile station receives power control information from the base station, and determines a variable capacitance for change of frequency characteristics based on the received power control information.

In accordance with an exemplary embodiment of the present invention, the mobile station determines whether it will change the antenna's frequency characteristics to the right direction or the left direction, and based thereon, may determine the variable capacitance. To this end, the mobile station performs an exemplary process as illustrated in FIG. 9.

Figure 9:
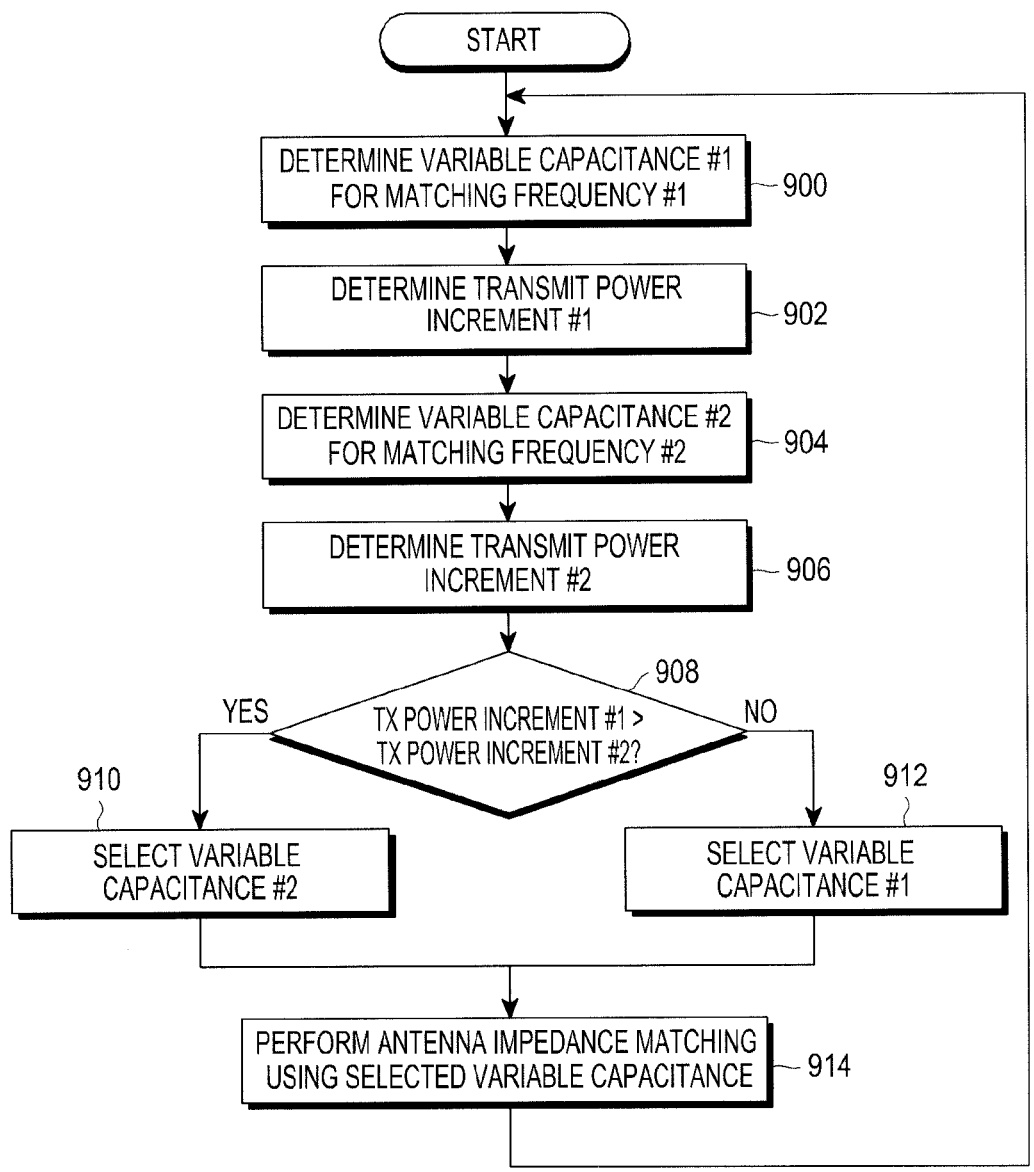
FIG. 9 is a flowchart illustrating a process of determining a variable capacitance for antenna impedance matching in a mobile station according to an exemplary embodiment of the present invention.

FIG. 9 is a flowchart illustrating a process of determining a variable capacitance for antenna impedance matching in a mobile station according to an exemplary embodiment of the present invention.

Referring to FIG. 9, the mobile station determines a first variable capacitance for a first matching frequency 'Matching Freq1' in step 900. The first matching frequency represents the frequency that has increased from the presently set reference frequency 'Fref' by a predetermined first value 'Fdelta1' (i.e., Matching Freq1=Fref+Fdelta1). The first variable capacitance may be determined using a table in which transmit power increments and frequency-specific variable capacitances are stored in association with each other.

The mobile station receives N pieces of power control information from the base station for a time period in which antenna impedance matching is performed using the first variable capacitance. The mobile station determines a first transmit power variation using the received N pieces of power control information. The first transmit power variation may be any one of a first transmit power increment and a first transmit power decrement, which are determined using the received N pieces of power control information.

For convenience of description, it will be assumed in FIG. 9 that the first transmit power variation represents the first transmit power increment. Therefore, in step 902, the mobile station determines the first transmit power increment using the received N pieces of power control information.

The first transmit power increment may be determined as follows. For example, the mobile station may determine an average of the N pieces of power control information as the first transmit power increment, if information for instructing to increase transmit power of the mobile station compared to the presently set transmit power is represented as '1', if information for instructing to decrease transmit power of the mobile station compared to the presently set transmit power is represented as '0', and any one of '1' and '0' is included in the power control information.

In step 904, the mobile station determines a second variable capacitance for a second matching frequency 'Matching Freq2'. The second matching frequency represents the frequency that has decreased from the presently set reference frequency 'Fref' by a predetermined second value 'Fdelta2' (i.e., Matching Freq2=Fref−Fdelta2). The second variable capacitance, similarly to the first variable capacitance, may be determined using a table in which transmit power increments and frequency-specific variable capacitances are stored in association with each other.

The mobile station receives N pieces of power control information from the base station for a time period in which antenna impedance matching is performed using the second variable capacitance. The mobile station determines a second transmit power variation using the received N pieces of power control information. The second transmit power variation, like the above-described first transmit power variation, may be any one of a second transmit power increment and a second transmit power decrement, which are determined using the received N pieces of power control information.

For convenience of description, it will be assumed in FIG. 9 that the second transmit power variation represents the second transmit power increment. Therefore, in step 906, the mobile station determines the second transmit power increment using the received N pieces of power control information.

The second transmit power increment may be determined using a method similar to the method of determining the first transmit power increment. Although it is assumed in the exemplary embodiment of FIG. 9 that the second transmit power increment is determined after the first transmit power increment is determined, it will be apparent to those of ordinary skill in the art that the second transmit power increment may be determined before the first transmit power increment is determined.

If the first transmit power increment and the second transmit power increment are determined, the mobile terminal compares the first transmit power increment with the second transmit power increment. The mobile station determines in step 908 whether the first transmit power increment is greater than the second transmit power increment.

If the first transmit power increment is greater than the second transmit power increment, the mobile station determines that the second matching frequency makes it possible to decrease the reflection coefficient compared to the first matching frequency. Therefore, in step 910, the mobile station selects a second variable capacitance corresponding to the second matching frequency.

However, if first transmit power increment is less than or equal to the second transmit power increment, the mobile station determines that the first matching frequency makes it possible to decrease the reflection coefficient compared to the second matching frequency. Therefore, in step 912, the mobile station selects a first variable capacitance corresponding to the first matching frequency.

Subsequently, in step 914, the mobile station performs antenna impedance matching using the selected variable capacitance.

As is apparent from the foregoing description, exemplary embodiments of the present invention may maximize the transmit power efficiency of an antenna in a wireless communication system. In addition, exemplary embodiments of the present invention may perform antenna impedance matching more easily and efficiently, using the power control method.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile station comprising:
a receiver for receiving power control information including information for controlling transmit power of the mobile station;
a matching controller configured to:
determine first and second transmit power variations of the mobile station based on respectively received power control information,
determine whether the first transmit power variation is greater than the second transmit power variation,
if it is determined that the first transmit power variation is greater than the second transmit power variation, select a second value of an impedance component,
if it is determined that the first transmit power variation is less than or equal to the second transmit power variation, select a first value of the impedance component, and
generate matching control information based on the selected one of the first and second values of the impedance component; and
an antenna matcher configured to perform antenna impedance matching depending on the generated matching control information.

2. The mobile station of claim 1, wherein the power control information is generated based on received signal strength measured in a base station.

3. The mobile station of claim 1, wherein the matching control information includes the selected one of the first and second values.

4. The mobile station of claim 3, wherein the antenna matcher performs the antenna impedance matching by using the selected one of the first and second values included in the generated matching control information.

5. The mobile station of claim 1, further comprising a power amplifier which is situated in a previous stage of the antenna matcher and amplifies a signal at a magnitude that is determined based on the received power control information.

6. A method for matching antenna impedance in a mobile station, the method comprising:
receiving power control information including information for controlling transmit power of the mobile station;
determining first and second transmit power variations of the mobile station based on respectively received power control information;
determining whether the first transmit power variation is greater than the second transmit power variation;
if it is determined that the first transmit power variation is greater than the second transmit power variation, selecting a second value of an impedance component;
if it is determined that the first transmit power variation is less than or equal to the second transmit power variation, selecting a first value of the impedance component;
generating matching control information based on the selected one of the first and second values of the impedance component; and
performing antenna impedance matching depending on the generated matching control information.

7. The method of claim 6, wherein the power control information is generated based on received signal strength measured in a base station.

8. The method of claim 6, wherein the matching control information includes the selected one of the first and second values.

9. The method of claim 8, wherein the performing of the antenna impedance matching comprises performing the antenna impedance matching by using the selected one of the first and second values included in the generated matching control information.

10. The method of claim 6, further comprising amplifying a signal at a magnitude that is determined based on the received power control information.

11. An apparatus for matching antenna impedance, the apparatus comprising:
an antenna matcher configured to, upon receiving matching control information, perform antenna impedance matching depending on the received matching control information,
wherein power control information, including information for controlling transmit power of a mobile station, is received from a base station, and
wherein the matching control information is generated by:
determining first and second transmit power variations of the mobile station based on respectively received power control information,
determining whether the first transmit power variation is greater than the second transmit power variation,
if it is determined that the first transmit power variation is greater than the second transmit power variation, selecting a second value of an impedance component,
if it is determined that the first transmit power variation is less than or equal to the second transmit power variation, selecting a first value of the impedance component, and
generating the matching control information based on the selected one of the first and second values of the impedance component.

12. The apparatus of claim 11, wherein the matching control information includes the selected one of the first and second values.

13. The apparatus of claim 12, wherein the antenna matcher performs the antenna impedance matching by using the selected one of the first and second values included in the received matching control information.

14. The apparatus of claim 11, wherein the power control information is generated based on received signal strength measured in the base station.

15. A method for matching antenna impedance, the method comprising:
receiving matching control information; and
upon receiving the matching control information, performing antenna impedance matching depending on the received matching control information,
wherein power control information, including information for controlling transmit power of a mobile station, is received from a base station, and
wherein the matching control information is generated by:
determining first and second transmit power variations of the mobile station based on respectively received power control information,
determining whether the first transmit power variation is greater than the second transmit power variation,
if it is determined that the first transmit power variation is greater than the second transmit power variation, selecting a second value of an impedance component,
if it is determined that the first transmit power variation is less than or equal to the second transmit power variation, selecting a first value of the impedance component, and
generating the matching control information based on the selected one of the first and second values of the impedance component.

16. The method of claim 15, wherein the matching control information includes the selected one of the first and second values.

17. The method of claim 16, wherein the performing of the antenna impedance matching comprises performing the antenna impedance matching by using the selected one of the first and second values included in the received matching control information.

18. The method of claim 15, wherein the power control information is generated based on received signal strength measured in the base station.

19. The mobile station of claim 1, wherein the impedance component includes a capacitance.

20. The method of claim 6, wherein the impedance component includes a capacitance.

21. The apparatus of claim 11, wherein the impedance component includes a capacitance.

22. The method of claim 15, wherein the impedance component includes a capacitance.

23. The mobile station of claim 1, wherein the first and second transmit power variations of the mobile station are determined based on the received power control information that respectively correspond to first and second matching frequencies.

24. The mobile station of claim 23, wherein the first and second values of the impedance component respectively correspond to the first and second matching frequencies.

25. The mobile station of claim 1, wherein the first value of the impedance is selected based on the first transmit power variation from among a plurality of first values of the impedance component that are each associated with predetermined transmit power variations, and
wherein the second value of the impedance is selected based on the second transmit power variation from among a plurality of second values of the impedance component that are each associated with predetermined transmit power variations.

26. The method of claim 6, wherein the determining of the first and second transmit power variations of the mobile station based on the respectively received power control information comprises determining the first and second transmit power variations of the mobile station based on the received power control information that respectively correspond to first and second matching frequencies.

27. The method of claim 26, wherein the first and second values of the impedance component respectively correspond to the first and second matching frequencies.

28. The method of claim 6, wherein the selecting of the first value of the impedance component comprises selecting the first value of the impedance based on the first transmit power variation from among a plurality of first values of the impedance component that are each associated with a respective predetermined transmit power variation, and
wherein the selecting of the second value of the impedance component comprises selecting the second value of the impedance based on the second transmit power variation from among a plurality of second values of the impedance component that are each associated with a respective predetermined transmit power variation.

29. The apparatus of claim 11, wherein the determining of the first and second transmit power variations of the mobile station based on the respectively received power control information comprises determining the first and second transmit power variations of the mobile station based on the received power control information that respectively correspond to first and second matching frequencies.

30. The apparatus of claim 29, wherein the first and second values of the impedance component respectively correspond to the first and second matching frequencies.

31. The apparatus of claim 11, wherein the selecting of the first value of the impedance component comprises selecting the first value of the impedance based on the first transmit power variation from among a plurality of first values of the impedance component that are each associated with a respective predetermined transmit power variation, and
　　wherein the selecting of the second value of the impedance component comprises selecting the second value of the impedance based on the second transmit power variation from among a plurality of second values of the impedance component that are each associated with a respective predetermined transmit power variation.

32. The method of claim 15, wherein the determining of the first and second transmit power variations of the mobile station based on the respectively received power control information comprises determining the first and second transmit power variations of the mobile station based on the received power control information that respectively correspond to first and second matching frequencies.

33. The method of claim 32, wherein the first and second values of the impedance component respectively correspond to the first and second matching frequencies.

34. The method of claim 15, wherein the selecting of the first value of the impedance component comprises selecting the first value of the impedance based on the first transmit power variation from among a plurality of first values of the impedance component that are each associated with a respective predetermined transmit power variation, and
　　wherein the selecting of the second value of the impedance component comprises selecting the second value of the impedance based on the second transmit power variation from among a plurality of second values of the impedance component that are each associated with a respective predetermined transmit power variation.

\* \* \* \* \*